United States Patent
Parry

(10) Patent No.: US 7,149,529 B2
(45) Date of Patent: Dec. 12, 2006

(54) METHOD AND SYSTEM FOR CONTROLLING SELECTIVE WIRELESS COMMUNICATION ACCESS

(75) Inventor: Travis Parry, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 849 days.

(21) Appl. No.: 09/850,503

(22) Filed: May 7, 2001

(65) Prior Publication Data

US 2002/0164997 A1  Nov. 7, 2002

(51) Int. Cl.
*H04Q 7/00* (2006.01)

(52) U.S. Cl. .................................. 455/456.1; 455/435

(58) Field of Classification Search ............ 455/456.1, 455/456.2, 456.3, 456.4, 458, 422.1, 33.1, 455/33.4, 421, 419, 413, 411, 410, 404.2, 455/440, 443, 444, 448, 456.6, 408, 435, 455/445, 450, 555, 405, 554, 438, 436, 426; 709/225, 228, 214, 249; 380/258

See application file for complete search history.

(56) References Cited

U.S. PATENT DOCUMENTS

| | | | |
|---|---|---|---|
| 5,712,973 A | 1/1998 | Dayan et al. | |
| 5,721,733 A | 2/1998 | Wang et al. | |
| 5,758,288 A | 5/1998 | Dunn et al. | |
| 5,905,719 A | 5/1999 | Arnold et al. | |
| 5,970,227 A | 10/1999 | Dayan et al. | |
| 6,005,853 A | 12/1999 | Wang et al. | |
| 6,377,805 B1* | 4/2002 | Anvekar et al. | 455/436 |
| 6,393,296 B1* | 5/2002 | Sabnani et al. | 455/466 |
| 6,405,049 B1* | 6/2002 | Herrod et al. | 455/517 |
| 6,584,089 B1* | 6/2003 | Honkasalo et al. | 370/338 |
| 6,611,688 B1* | 8/2003 | Raith | 340/992 |
| 2002/0051540 A1* | 5/2002 | Glick et al. | 380/258 |
| 2002/0077144 A1* | 6/2002 | Keller et al. | 455/550 |
| 2002/0119788 A1* | 8/2002 | Parupudi et al. | 455/456 |
| 2003/0040302 A1* | 2/2003 | Okada | 455/414 |
| 2003/0157963 A1* | 8/2003 | Collot | 455/557 |
| 2003/0208595 A1* | 11/2003 | Gouge et al. | 709/225 |
| 2004/0077349 A1* | 4/2004 | Barak et al. | 455/436 |

FOREIGN PATENT DOCUMENTS

EP  1071302 A2  1/2001

* cited by examiner

*Primary Examiner*—Melody Mehrpour

(57) ABSTRACT

A method controls wireless communication access by defining a zone with at least one first computing device and then selectively permitting wireless communication access for a second computing device to the first computing device based on a position of the second computing device relative to the zone. A wireless communication access control system comprises at least one first computing device and a second computing device. The first and second computing device each include a controller and a wireless communication transceiver for communicating with each other. The first computing device is configured for controlling an access zone adjacent the first computing device wherein the first computing device is configured for permitting selective wireless communication access to the first computing device for the second computing device based on a position of the second computing device relative to the zone.

20 Claims, 5 Drawing Sheets

METHOD AND SYSTEM FOR CONTROLLING SELECTIVE WIRELESS COMMUNICATION ACCESS

THE FIELD OF THE INVENTION

The present invention is generally related to computer-based communication systems and in particular, is related to a computer-based wireless communication access system and method.

BACKGROUND OF THE INVENTION

The computer revolution has given us a previously unimagined ability to produce and access mountains of information. Almost all new information is created and stored with a computer while vast printed records have also made their way into digital form. The availability of this information has added tremendous convenience to us personally, and has profoundly affected our productivity. Information has, in some ways, become the most important asset to people personally and/or in business. However, as we embrace the information age, we face old problems in a new way.

Traditional assets, like a factory or an office desk, are fairly well protectable. Any burglar attempting to steal these items typically faces formidable physical obstacles such as locks, walls, gates, and guards and also faces electronic security including motion detectors, monitoring cameras, electronic locks and doorway sensors. While no security system is foolproof, the odds of preventing a burglary or catching the burglar increase with each level of security that is added. Even if the burglar gains entry into a building, the burglar still must physically identify the desired item and remove it from the premises. The chances of getting caught are high.

Unlike physical assets, information can be much easier to steal. An information burglar need never set foot within a building that has the information they want to get. Many computer information burglars have penetrated sophisticated computer systems with significant security systems. Using viruses and other techniques, these thieves can steal or destroy information on a grand scale. The key to gaining unauthorized access to computer information often begins with entry into a general network, such as the Internet, or general business network. The computer burglar then uses a stolen password, or a custom deciphering/deception computer program to overcome or bypass encryption and security technology of the targeted computer system.

In other circumstances, security is not necessary to keep out a computer information burglar but is only needed within a computer network to restrict computer access to only certain persons and/or within certain areas. Common techniques for accomplishing this goal include electronic passwords and/or physical boundaries such as walls.

The computer industry has maintained an ongoing effort to use encryption technology, computer firewalls, and other techniques to combat computer information theft. However, computer theft is still rampant. Accordingly, additional forms of security for computer information are still necessary.

SUMMARY OF THE INVENTION

A method of the present invention controls wireless communication access. The method includes defining a zone with at least one first computing device and then selectively permitting wireless communication access for a second computing device to the first computing device based on a position of the second computing device relative to the zone.

A wireless communication access control system comprises a at least one first computing device and a second computing device. The first and second computing device each include a controller and a wireless communication transceiver for communicating with each other. The first computing device is configured for controlling a zone adjacent the first computing device wherein the first computing device is configured for permitting selective wireless communication access to the first computing device for the second computing device based on a position of the second computing device relative to the zone.

DESCRIPTION OF THE PREFERRED EMBODIMENTS

Figure 1:
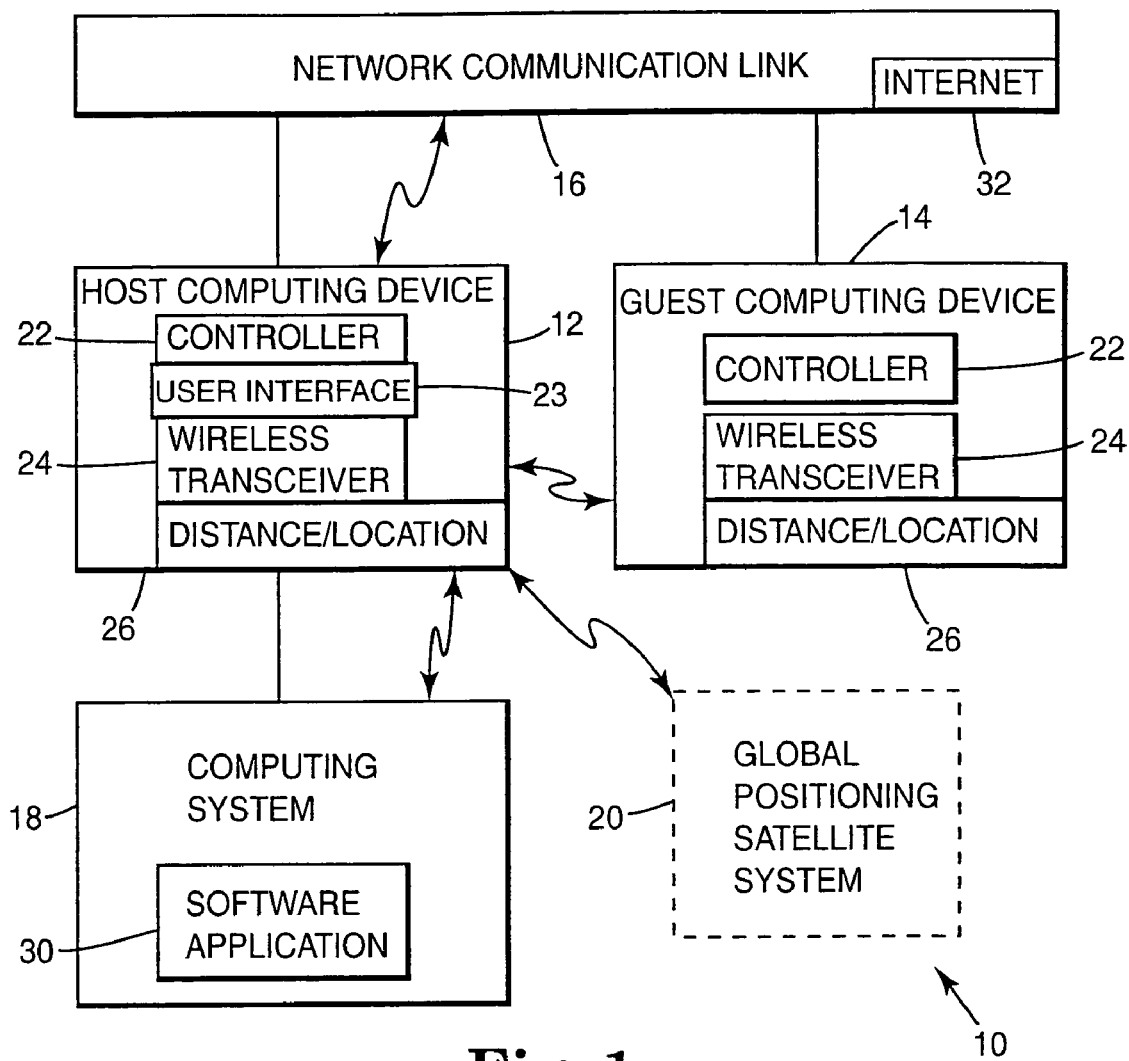
FIG. 1 is a block diagram illustrating one exemplary embodiment of a wireless access control system of the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Components of the wireless access control method and system of the present invention can be implemented in hardware via a microprocessor, programmable logic, or state machine, in firmware, or in software within a given device. In one aspect, at least a portion of the software programming is web-based and written in HTML and JAVA programming languages, including links to graphical user interfaces for data collection, such as a windows based operating system, and each of the main components may communicate via a network using a communication bus protocol. For example, the present invention may or may not use a TCP/IP protocol suite for data transport. Other programming languages and communication bus protocols suitable for use with the present invention will become apparent to those skilled in the art after reading the present application. Components of the present invention may also reside in software on one or more computer-readable mediums. The term computer-readable medium as used herein is defined to include any kind of memory, volatile or non-volatile (e.g., floppy disks, hard disks, CD-ROMs, flash memory, read-only memory (ROM), and random access memory (RAM)).

Preferably, the user interfaces described herein run on a controller, computer, appliance or other device having an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." Each window has its own adjustable boundaries which allow the user to enlarge or shrink the application or document relative to the display screen. Each window can act independently, including its own menu, toolbar, pointers, and other controls, as if it were a virtual display device. Other software tools may be employed via the window, such as a spreadsheet for collecting data. The operating system preferably includes a windows-based dynamic display which allows for the entry or selection of data in dynamic data field locations via an input device such as a keyboard and/or mouse. One preferred operating system is a Windows® brand operating system sold by Microsoft Corporation. However, other operating systems which provide windowing environments may be employed, such as those available from Apple Corporation or IBM. In another embodiment, the operating system does not employ a windowing environment.

FIG. 1 illustrates an exemplary embodiment of a wireless access control system 10 according to the present invention. System 10 includes first computing device 12, second computing device 14, network communication link 16, computing system 18, and optional global positioning satellite system (GPS) 20. Both first computing device 14 and second computing device 12 include controller 22, wireless transceiver 24, and distance/location module 26. First computing device 12 further includes user interface 23 while computing system 18 optionally further includes software application 30, which optionally includes email or network browsing capabilities.

First computing device 12 acts as a gateway for controlled wireless communication access by second computing device 14 to first computing device 12, a network of first computing devices 12, computer system 18 with software application 30, and/or network communication link 16. In other words, first computing device 12 comprises an access point to computer resources within first computing device 12, or within other computing devices, systems, or networks that are connected to or in communication with first computing device 12.

First computing device 12 and second computing device 14 each include wireless transceiver 24 to facilitate wireless communication between the devices, as well as with other wireless capable computing devices. In addition, distance/location module 26 is included separately, or as part of wireless transceiver 24, to enable one or more first computing devices 12 to determine an absolute or relative position of second computing device 14 and of first computing devices 12. Together, wireless transceiver 24 and distance/location module 26 act as a position locator. Global positioning satellite system 20 optionally assists the one or more first computing devices 12 in determining the position of second computing device 14 and/or one or more first computing devices 12. Based upon the absolute or relative position of second computing device 14, relative to an access zone adjacent to the position of at least one first computing device 12, second computing device 14 will be selectively denied or permitted access to first computing device(s) 12, network communication link 16, computing system 18, and/or software application 30.

Wireless access control system 10 includes user interface 23 operating on first computing device(s) 12 (with or without computer system 18). User interface 23 can be implemented in hardware via a microprocessor, programmable logic device, or state machine, and firmware, or in software within a given device. In one aspect, at least a portion of the software programming is written in Java programming language, and user interface 23 communicates with other computing devices via network communication link 16 using a communication bus protocol. For example, the present invention optionally can use a TCP/IP protocol suite for data transport. In another aspect, the present invention does not use a TCP/IP protocol suite for data transport. Other programming languages and communication bus protocols suitable for use with user interface 23 and wireless access control system 10 will be apparent to those skilled in the art, such as ultrawideband (UWB), Bluetooth, and infrared (e.g. FiR).

Network communication link 16, as used herein, includes an Internet communication link, an intranet communication link, or similar high-speed communication link. In one preferred embodiment, network communication link 16 includes Internet communication link 32. Network communication link 16 permits communication between first computing devices 12 (and any connected computing systems) and/or second computing devices 14.

Second computing device 14 is preferably configured as a handheld and/or wireless mobile computing device such as a handheld or notebook computer, personal digital assistant, or mobile phone, although second computing device 14 also can be a desktop or stationary computing device. While first computing device 12 can be configured substantially the same as second computing device 14 for mobility and ease in setting an access zone, first computing device(s) 12 is preferably a stationary computing device such as a desktop computer or computing appliance that is selectively fixable to a physical structure such as a wall, floor, ceiling, etc.

Wireless communication among first computing devices 12, and between first computing devices 12 and second computing devices 14, is accomplished using one or more known communication and application protocols such as Wireless Application Protocol (WAP), Bluetooth, Infrared (IrDA, FIR), 802.11 as well as other communication and application protocols known to those skilled in the art, such as UltraWideBand (UWB). First computing devices 12 and second computing devices 14 each include communication hardware and software known in the art for implementing these protocols, such as wireless transceiver 24. Wireless transceiver 24 includes or is in communication with distance/location module 26 and in combination with distance/location modules 26 of other computing devices 12, 14, determines a relative or absolute position of first and second computing devices 12, 14. Distance/location module 26 also optionally incorporates or communicates with global positioning satellite system (GPS) 20 to provide these functions.

Of particular interest are wireless communication protocols such as infrared (e.g., FiR), Bluetooth, and UltraWide Band (UWB) which permit direct radio or beamed communication between two or more compatible devices that operate independently of a network and independently of network communication link 16. This feature permits direct one-on-one communication between two similarly configured computing devices without any communication intermediary. In the example of the Bluetooth protocol, the communication link preferably is established by the mere presence of each respective device (e.g., multiple first computing devices 12 and second computing device(s) 14) in close proximity to each other. This instant synchronization enables users to immediately communicate with each other without taking time to manually establish a connection or communication link. Of course, in the method and system of the present invention, a controlled access zone is operated by first computing device(s) 12 to retain selective control of when any communications link is established (or recognized) to prevent undesirable communication linking or access (by third party interveners) to first computing devices 12. Finally, if necessary, first computing devices 12 also can communicate with each other through more conventional indirect routes such as wired or wireless network links, wired or wireless Internet links, or telecommunications networks.

The UltraWideBand protocol preferably is implemented in hardware as a chipset and permits wireless communication between multiple computing devices while simultaneously providing the ability to determine distance, location, and tracking of respective computing devices. In this arrangement, distance/location module 26 is incorporated in wireless transceiver 24 of both first and second computing devices 12,14 as part of the ultrawideband integrated chip technology and communication protocol. Ultrawideband hardware suitable for these purposes can be obtained from Time Domain corporation of Huntsville, Ala.

Computing system 18 preferably is a microprocessor based computing device. Computing devices 12,14 and computer system 18 use a controller 22 that includes hardware, software, firmware or combination of these. In one preferred embodiment controller 22 includes a computer server or other microprocessor based system capable of performing a sequence and logic operation and including memory for storing information. In addition, controller 22 can include a microprocessor embedded systems/appliance incorporating tailored appliance hardware and/or dedicated single purpose hardware.

Figure 2:
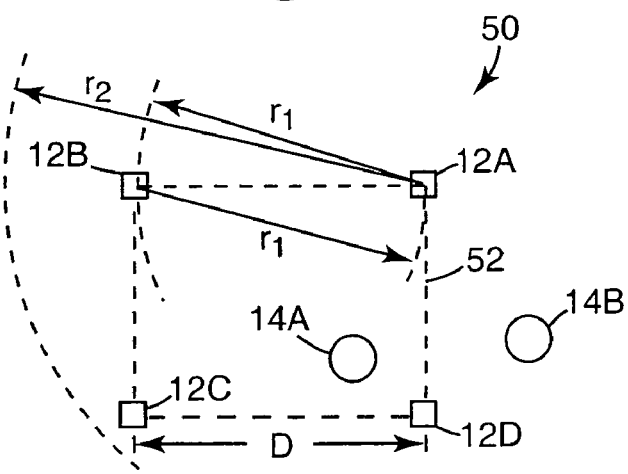
FIG. 2 is a diagram illustrating one exemplary embodiment of an wireless access control system of the present invention.

As shown in FIG. 2, wireless access determination system 50 according to the present invention defines access zone 52 in which wireless communication access for a second computing device 14 will be either selectively denied or permitted to first computing device(s) 12. While zone 52 shown in FIG. 2 is defined by four first computing devices (12A–12D), a fewer or greater number of first computing devices 12 optionally are used to define zone 52, depending upon the radius of signal transmission from each first computing device 12. In particular, to insure that each of the four wireless first computing devices 12 successfully communicates with each other and any second computing device 14 within zone 52, the radius of signal transmission from each first computing device 12 is preferably equal to (e.g., $r_1$) or greater than (e.g., $r_2$) a distance D from their respective first computing devices 12. When adjacent first computing devices 12 (e.g. 12A and 12B) have a radius of transmission of $r_1$, then complete overlap exists between the signal transmission area of adjacent first computing devices 12. This overlap insurers communication between first computing devices 12A and 12B, as well as insuring that the position of second computing device 14 can be determined by adjacent first computing devices 12. While the radius of transmission for each first computing device 12A–12D could be different, the radius of transmission for each first computing device 12 preferably is the same to insure uniformity in the area of common transmission between first computing devices 12. Finally, for additional security, the distance D, as well as the number and arrangement of first computing devices 12, is preferably selected to define a zone corresponding to a physical boundary such as a walled room or building.

With this arrangement, second computing device 14A is permitted access to first computing device 12 (and/or connected computer devices, systems, and networks) because second computing device 14A is within access zone 52. Alternatively, with a radius of transmission that is sufficiently large, access can be denied to second computing device 14A within zone 52, while access is permitted to second computing device 14B outside of zone 52.

Figure 3:
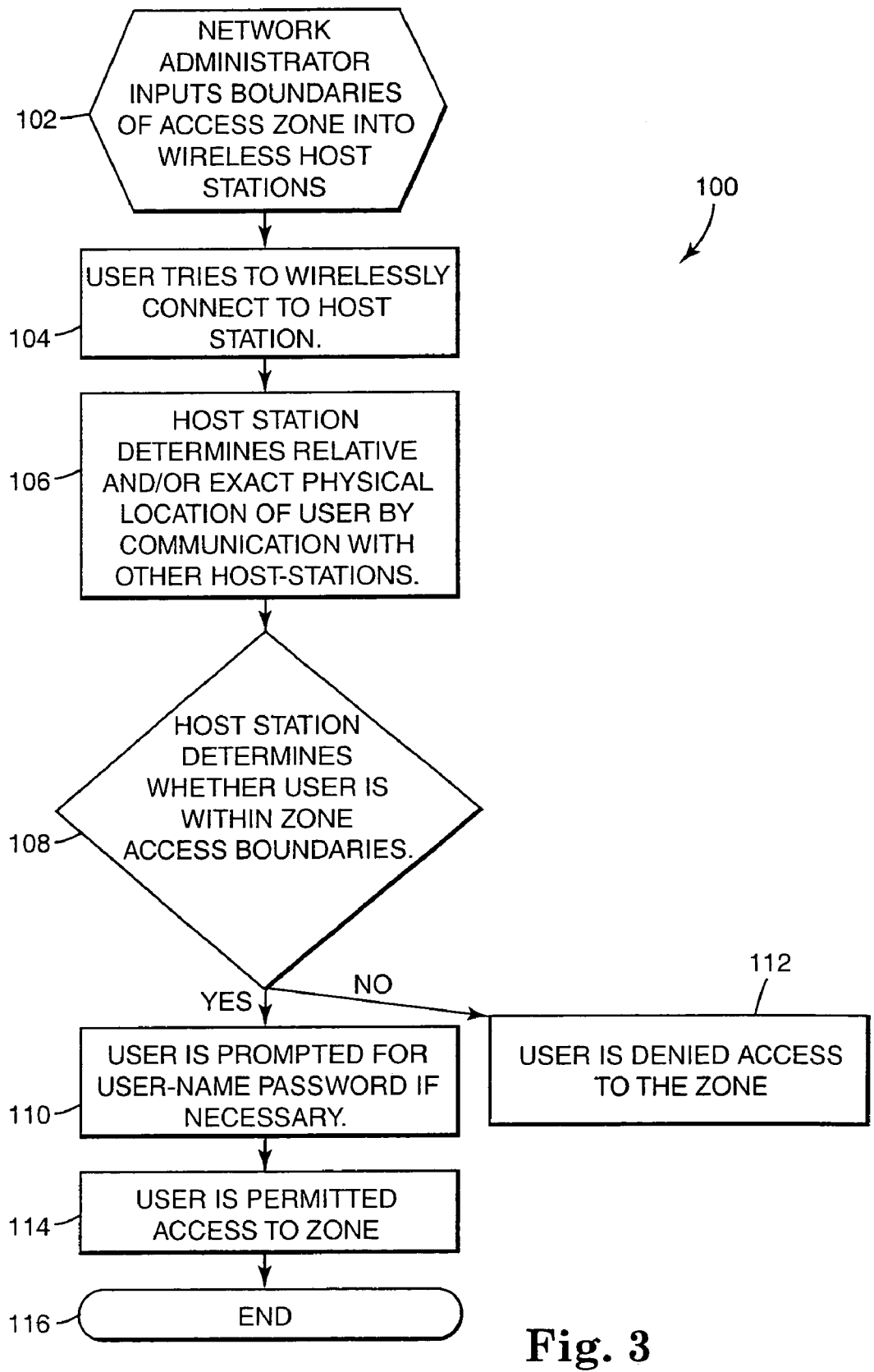
FIG. 3 is a flow diagram illustrating one exemplary embodiment of a method of wireless access control of the present invention.

In conjunction with system 50, a method of determining and controlling wireless access 100 of the present invention is shown generally in FIG. 3. In a first step (step 102), a network administrator identifies and inputs an area of availability for wireless access into each first computing device 12. First computing devices 12 act as wireless communication host stations. The area of availability is determined by any one of several techniques, each of which rely on establishing the position of first computing devices 12 relative to one another and/or establishing an absolute position of each first computing device 12. In one arrangement, an administrator could simply arrange a group of first computing devices in a desired pattern. Because each first computing device 12 is equipped with distance/location module 26, mere wireless communication between first computing devices 12 that have a common transmission area will identify a relative location and/or distance between first computing devices 12. With all of the first computing devices 12 communicating in this fashion, an electronic map of the positions of first computing devices 12 is determined. One of the first computing devices 12 optionally is selected as a master first computing device that stores these mapped positions which correspond to landmarks that mark the boundaries of zone 52. Alternatively, each first computing device 12 acts a master device in the sense that each can store the mapped positions.

In an alternate embodiment, an administrator optionally uses global satellite positioning system 20 to determine the absolute position of each first computing device 12. Likewise, an administrator can optionally physically measure the boundaries of the desired pattern (measuring both distance and direction) and then enter that data into one or more master first computing devices 12. Finally, where fewer first computing devices 12 are used to mark the boundaries of an access zone, the administrator can manually walk the physical boundaries of the access zone with a first computing device 12, allowing one or more other fixed first computing devices to detect the distance and direction of the administrator at zone landmarks (e.g. corners of a pattern). The administrator selectively commands one or more first computing devices 12 to store the position (distance and direction, or absolute coordinates) of the zone landmarks and access zone boundaries as the administrator marks the boundaries.

Once the zone is established in step 102, a user with second computing device 14 attempts to wireless connect to first computing device 12 (step 104) for access to first computing device(s) 12, network communication link 16, and/or computing system 18 (with or without software application 30). To do so, the user wirelessly sends an access request to first computing device 12 (e.g. host station). If second computing device 14 is not authorized or not properly equipped for such communication, then first computing device 12 will reply with a message that access is denied. Alternatively, first computing device 12 prevents access to second computing device 14 but does not even reply to second computing device 14 to avoid revealing the presence of first computing device 12 and/or the first computing device's knowledge of attempted access by second computing device 14.

On the other hand, where second computing device 14 is properly equipped to communicate with first computing device 12, then first computing device(s) 12 (e.g. host stations) communicate with each other to determine a relative or absolute position of second computing device 14 deployed by a user (step 106). Then system 10, through first computing device 12, determines if the position of second computing device 14 deployed by the user falls within zone 52 (step 108). Access to first computing device 12, network communication link 16, and/or computer system 18 is permitted for second computing device 14 within access zone (step 114). However, for additional security, first computing device 12 also optionally prompts the user of second computing device 14 for a password before access is granted (step 110). On the other hand, if the position of second computing device 14 falls outside of the selected zone 52, then second computing device 14 deployed by the user is denied access to zone 52. (step 112).

Figures 4, 5:
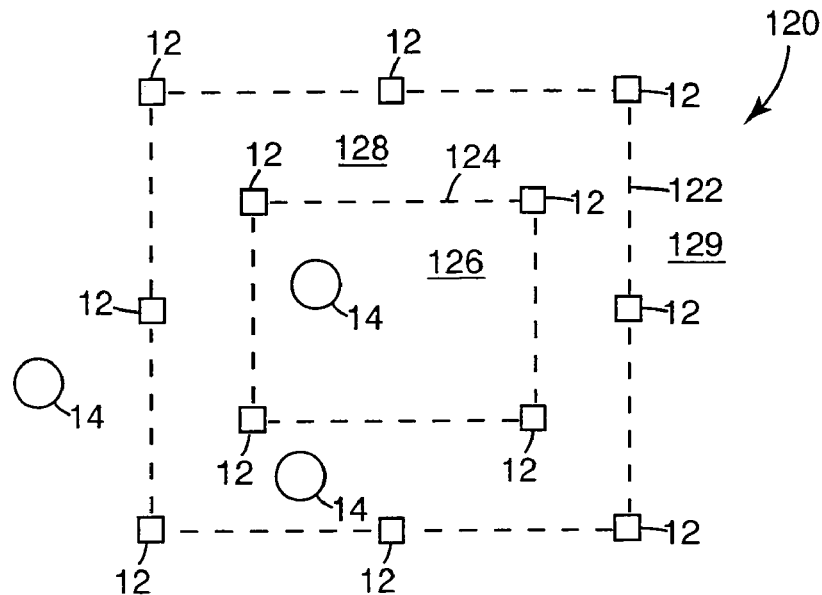
FIG. 4 is a diagram illustrating one exemplary embodiment of a multiple zone wireless access control system of the present invention.
FIG. 5 is a block diagram illustrating one exemplary embodiment of an user interface of a wireless access control system of the present invention.

FIG. 4 illustrates another exemplary embodiment of a wireless access control system 120 according to the present invention. System 120 provides selective access for wireless communication to first computing device(s) 12 and/or connected computing devices, systems, and networks. System 120 includes first boundary 122, second boundary 124, first inner access zone 126, second intermediate access zone 128, and third outer access zone 129. First and second boundaries 122 and 124 are formed by positioning several first computing devices 12, which preferably define nested rectangles. However, any shape or pattern (e.g. circles, triangles, etc.) can be formed by positioning first computing devices 12 to define nested first and second boundaries 122 and 124. First and second boundaries 122 and 124 in turn define three access zones, namely, first inner zone 126, second intermediate zone 128, and third outer zone 129.

In this embodiment, one or more access zones 126, 128, 129 are selectively activated to either permit or deny wireless access for second computing device 14. In one access configuration, inner access zone 126 permits wireless communication access while intermediate access zone 128 and outer access zone 129 deny wireless communication access. Outer zone 129 optionally provides access to the extent that second computing device 14 falls within a common transmission area of adjacent first computing devices so that first computing devices 12 can accurately determine the identity and position of second computing device 14.

In an alternate access configuration, inner access zone 126 and outer zone 129 deny access to second computing device 14 while intermediate zone 128 permits access. Finally, in another access configuration, all of the three zones 126, 128, 129 act together to deny or permit access as selected by the access administrator.

As shown in FIG. 5, wireless access control system 10 further comprises user interface 23. User interface 23 permits an administrator to setup, operate and maintain a wireless access control system of the present invention, including controlling access zones, as well as monitoring both first and second computing devices 12, 14.

User interface 23 includes zone parameter monitor 132, first network monitor 134, access status monitor 136, and client list monitor 140. In cooperation with host network monitor 134, zone parameter monitor 132 facilitates creating, operating and maintaining access zones. Zone parameter monitor 132 includes activation function 142, zone designation 144, exclusion/inclusion function 146, size function 148, shape function 150, distance function 152, password function 154, and boundary function 155.

Activation function 142 controls whether a given access zone identified in zone designation 144 is active or disabled. Zone designation 144 further identifies which first computing devices 12 define an access zone. Exclusion/inclusion function 146 determines whether a specified access zone (e.g. zone 1, zone 2) is used to exclude access or to include access to first computing devices 14. Size function 148, shape function 150, and distance function 152 permit specifying, respectively, the size, shape, and distances that define an access zone. Password function 154 permits setting a password for an access zone. Boundary function 155 permits entry and/or modification of the boundaries of an access zone, particularly including the entry and storage of the position of each first computing device 12.

Host network monitor 134 includes host status 156, which identifies each first computing device 12 acting as a host (e.g. host #1), whether the host is active or disabled, and the position of the first computing device 12. Client list monitor 140 includes client register 158 which identifies each second computing device 14 (e.g. client #1), whether the client is present or absent from the access zone, the position of the second computing device 14, and the password associated with each second computing device 14. Access status monitor 136 identifies a history of access attempts, including the most recent access attempt, and specifies an identification of each second computing device (client ID) 160, the position 162 of second computing device 14 during the attempted access, and whether access was denied or permitted 164.

Figure 6:
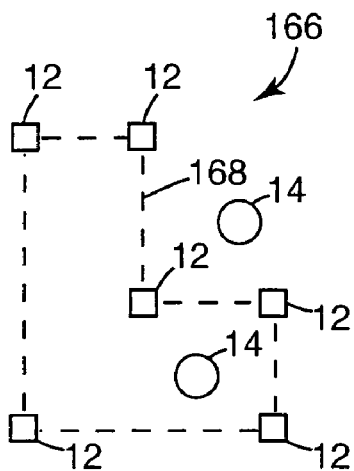
FIG. 6 is a diagram illustrating one exemplary embodiment of an generally L-shaped wireless access control system of the present invention.

FIG. 6 illustrates wireless access control system 166 that defines access zone 168, which includes first computing devices 12 arranged in an L-shaped pattern. Access is provided in zone 168 to second computing device(s) 14 and denied to second computing device(s) outside of zone 168, or vice versa.

Figure 7:
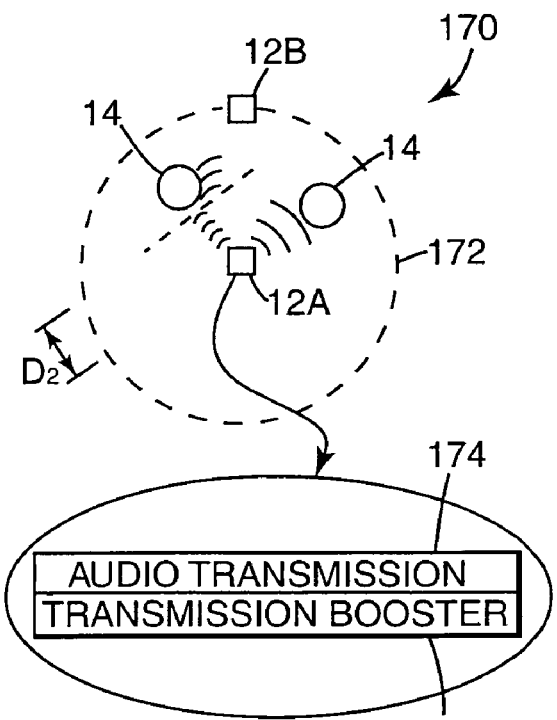
FIG. 7 is a diagram illustrating one exemplary embodiment of an signal-boosting wireless access control system of the present invention.

FIG. 7 illustrates another wireless access control system 170 in which wireless access is denied or permitted to generally circular access zone 172. System 170 includes central first computing device 12A, optional first computing device 12B located at a perimeter of generally circular zone 172, and one or more second computing devices 14. In one arrangement, both optional first computing device 12B and central first computing device 12A are present along with at least one second computing device 14.

In an alternate arrangement, only central first computing device 12B is present along with one second computing device 14. In this embodiment, first computing device 12B is limited to detecting the distance of the second computing device 14. Access is determined in this arrangement of system 170 by whether second computing device 14 falls within a specified radial distance of central first computing device 12A (e.g. within 20 feet).

In another alternate arrangement, only central first computing device 12A is present along with two second computing devices 14 that are within zone 172. With three computing devices, both distance and direction are used to determine the position of the guest computing devices relative to zone 172. In this arrangement, no access is granted until both second computing devices 14 are present. This limitation provides another level of security that no access is granted until two independent second computing devices 14 simultaneously are within the specified zone 172.

FIG. 7 also further illustrates optional distance-dependent audio transmission mechanism 174 and/or optional transmission booster mechanism 175, according to the present invention. Audio transmission mechanism 174 causes central first computing device 12 to emit an audio sound transmission and then intensify a volume of that transmission as a distance between second computing device 14 and central first computing device 12A increases. Once second computing device 14 leaves the authorized access zone, the audio sound transmission is terminated. Transmission booster mechanism 175 selectively boosts a wireless communication signal transmitted from wireless transceiver 24 of first computing device 12 when second computing device 14 is separated from first computing device 12 by a distance greater than a selected distance D2 from first computing device 12.

Figure 8:
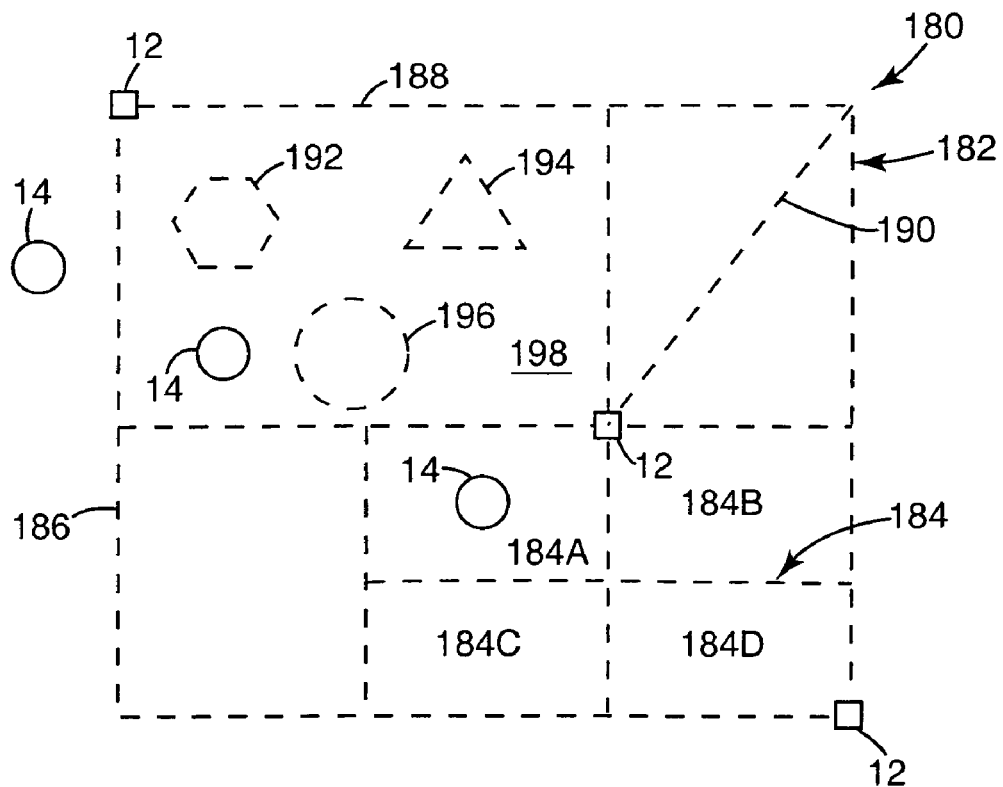
FIG. 8 is a diagram illustrating one exemplary embodiment of a multiple zone wireless access control system of the present invention.

FIG. 8 illustrates multizone wireless access control system 180 of the present invention including various shaped and sized zones of access. In particular, system 180 includes master access zone 182 which comprises several subzones including quadrant zone 184, rectangular zone 186, group zone 188 with n-gon zone 192, triangular zone 194, circular zone 196, and exclusion zone 198. Zone 182 further comprises a pair of triangular zones 190.

Access to master zone 182 and each of these subzones is controlled independently, together, or in selective groups. Likewise, access to various shaped zones can be mixed and matched to achieve a desired pattern of access. For example, in one access configuration, access is denied to all zones in master zone 182 except for subzones 184A, B in quadrant zone 184 to provide a corridor or room of wireless communication access for second computing device 14. Conversely, access is permitted everywhere in master zone 182 except in subzones 184A, 184B to prevent wireless communication access in a corridor or selected room. Accordingly, with system 180, access is selectively denied or permitted for second computing device 14 in selected zones within master zone 182 at the discretion of the administrator of system 180. Moreover, in addition to access being dependent on the position of the second computing device 14, access to master zone 182 and its subzones optionally is sensitive to an identity (e.g. guest ID 160) and password (154) associated with each second computing device 14. Finally, access to any particular zone, or all the zones in master zone 182, is also optionally time dependent or calendar dependent so that access is selectively denied or permitted based on the time of day or day of the week, month or year.

Figure 9:
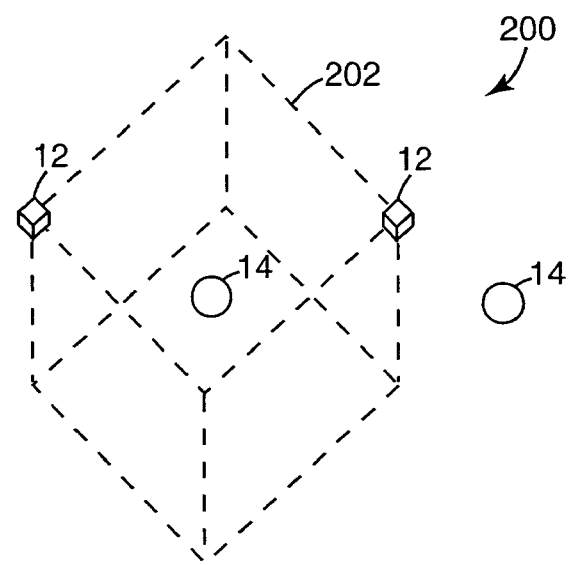
FIG. 9 is a diagram illustrating one exemplary embodiment of a three-dimensional wireless access control system of the present invention.

FIG. 9 illustrates three-dimensional wireless access control system 200 that defines three dimensional access zone 202. While zone 202 preferably is generally cube shaped, three-dimensional zone 202 optionally carries other shapes such as spheres, hemispheres, n-gons, pyramids, cones, etc. The only limit on the shapes and sizes of three-dimensional access zone 202 is the ability to place a sufficient number of first computing devices in the proper locations along the boundaries necessary to define the desired shape. A combination of three computing devices is preferably used to operate system 200 with first computing device(s) 12 having a sufficiently large radius of transmission to encompass the desired boundary. The three computing devices preferably comprise one first computing device 12 with two second computing devices 14, or two first computing devices 12 with one second computing device 14. Second computing device(s) 14 also have a sufficient radii of transmission to reciprocally communicate with first computing device(s) 12. With three-dimensional access zone, global positioning satellite system 20 is not required but is convenient for establishing and/or tracking the position of first computing devices 12 and/or second computing devices 14.

Figure 10:
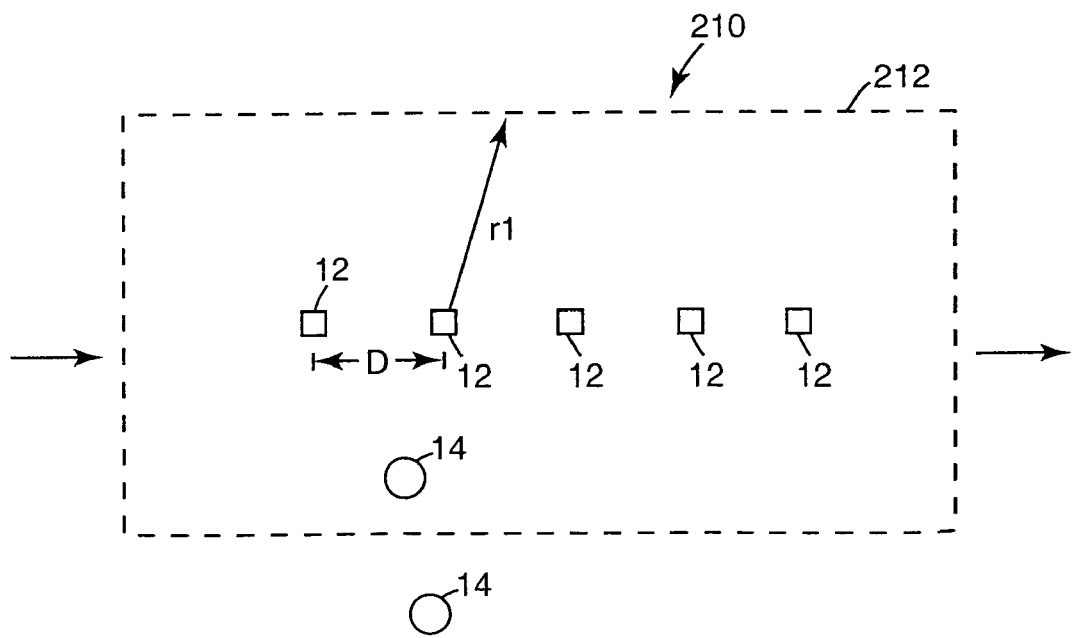
FIG. 10 is a diagram illustrating one exemplary embodiment of a mobile wireless access control system of the present invention.

FIG. 10 illustrates a mobile wireless access control system 210 that defines mobile access zone 212. System 210 includes a plurality of first computing devices 12 that move in a generally synchronized manner to maintain a pattern such as longitudinal access zone 212. As shown, first computing devices 12 are aligned generally rectilinearly with a distance D between the adjacent first computing devices 12. This distance D may or may not be uniform between all of the respective first computing devices 12. Each first computing device 12 has its own radius $r_1$ of transmission, although this transmission radius is preferably substantially the same for all first computing devices 12. With this system, all first computing devices 12 preferably move together in the same direction to maintain a limited zone of access that surrounds the first computing devices and moves along the direction of travel of first computing devices 12. However, the shape and size of mobile access zone 212 is strictly dependent on the number and relative placement of first computing devices 12 as they move together. Thus, mobile access zone 212 optionally can be elliptical, circular, or have other shapes that maintain a contiguous area for controlling access. Accordingly, the shape and size of the access zone can change as the group of first computing devices 12 move together. Mobile access zone 212 is used to either deny or permit access to second computing device(s) 14, and optionally includes subzones as illustrated in FIG. 6, which also optionally can move within mobile access zone 212.

Any one of the systems of the present invention discussed herein also optionally include the following features, which can be used together or added separately. First, first computing devices 12 also are capable of tracking the position of all computing devices (e.g. both first and second computing devices 12, 14) that are within the defined access zone that include a wireless transceiver 24. This feature allows an administrator or user to identify whether a computing device is actively in use as a first computing device (e.g. host station) and to create a map of the position of all first computing devices 12 and second computing devices 14 within a selected access zone. Second, as part of controlling access within a zone, access to software application 30 of computer system 18 is selectively permitted based on the identity (e.g. client ID 160) of second computing device 14. With this feature, a software application running within an access zone is either selectively activated or selectively deactivated upon the entry, presence, or exit relative to an access zone of a second computing device 14 having a select identity.

A wireless communication access control system of the present invention carries many advantageous features. Foremost, this system provides an additional level of security for a computing device, system and/or network by maintaining a zone in which wireless communication access is selectively permitted or denied. The boundaries of the access zone preferably correspond to physical boundaries such as the walls of a room or building, as well as floors and ceilings as desired. This arrangement simultaneously provides two forms of security since a room can prevent unauthorized access by the presence of the walls and locked doors while the wireless access control system of the present invention controls access based on the position of the access-seeking device relative to the controlled zone. The system and method permits zones of any shape and/or size, as well as individual control over subzone within a master zone.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of controlling wireless computing access comprising:
    defining an access zone via a plurality of first computing devices spaced from each other in a pattern and in proximity close enough to enable direct wireless non-networked communication with each other to define a boundary encompassing the access zone; and
    authorizing wireless computing access for a second mobile computing device to at least one of the first computing devices based on a position of the second mobile computing device relative to the access zone as determined via direct wireless non-networked communication between at least one of the first computing devices and the second mobile computing device.

2. The method of claim 1 and further comprising:
    determining the position of the first computing devices and second mobile computing device as an absolute position via an absolute position locator.

3. The method of claim 1 wherein authorizing wireless computing access comprises:
    authorizing computing access for the second mobile computing device when the position of the second mobile computing device is within the access zone.

4. The method of claim 1 wherein authorizing wireless computing access comprises:
    denying computing access for the second mobile computing device when the position of the second mobile computing device is within the access zone.

5. The method of claim 1 wherein authorizing wireless computing access comprises:
    identifying at least one authorized first computing device of the plurality of first computing devices within the access zone for which wireless computing access by the second computing device is authorized; and
    detecting and mapping a position of the at least one authorized first computing device and the second computing device within the access zone.

6. The method of claim 1 wherein authorizing wireless computing access comprises:
    authorizing wireless computing access to the first computing device when only both the second mobile computing device and a third mobile computing device are within the access zone and when only both the second and third mobile computing devices have authorized identities.

7. The method of claim 1 authorizing wireless computing access comprises:
    defining the at least one first computing device as an access point to enable wireless computing access by the second mobile computing device to computer resources accessible via at least one of a computer system in communication with at least one of the first computing devices.

8. A method of controlling wireless computing access comprising:
    defining an electronic access zone via a plurality of first computing devices spaced from each other in a pattern and in direct non-networked wireless communication with each other to define a boundary encompassing the access zone;
    enabling wireless computing access within the electronic access zone, via at least one of the first computing devices, to a software application accessible via at least one of a network communication link in communication with at least one of the first computing devices, a computer in communication with at least one of the first computing devices, and the first computing devices;
    determining whether a second mobile computing device is within the electronic access zone via direct non-networked wireless communication between the second mobile computing device and at least one of the first computing devices; and
    maintaining activation of the software application, based upon an identity of the second mobile computing device when the second mobile computing device is outside the electronic access zone and deactivating the software application, based on the identify of the second mobile computing device, when the second mobile computing device is within the electronic access zone.

9. A method of controlling multi-zone wireless computing access comprising:
    providing a computing system including computer resources;
    defining a plurality of sub-zones within a master zone of selective wireless computing access to the computer resources of the computing system via a plurality of first stationary computing devices spaced from each other and in direct non-networked wireless communication with each other; and
    authorizing wireless computing access to the computing resources of the computing system for a second mobile computing device based on a position of the second mobile computing device relative to each of the sub-zones as determined via direct non-networked wireless communication between at least one of the first stationary computing devices and the second mobile computing device.

10. The method of claim 9 wherein defining a plurality of sub-zones comprises:
    defining the sub-zones to include a first access sub-zone nested within a second access sub-zone with a boundary of the first access sub-zone defined by a first group of the first stationary computing devices and a second access sub-zone including an inner boundary defined by the boundary of the first access zone and an outer boundary defined by a second group of first stationary computing devices; and selectively activating wireless computing access to the computing system for the second mobile computing device within at least one of the first access zone and the second access zone based on a position of the second mobile computing device relative to the first access zone and the second access zone.

11. A method of controlling wireless computing access comprising:
defining a computing access zone via a plurality of first mobile computing devices of a mobile computing system with the first mobile computing devices spaced from each other by a generally uniform distance between adjacent first computing devices, and in proximity close enough to each other to enable a radius of wireless transmission from each first computing device to generally exceed a distance between the adjacent first mobile computing devices to enable direct non-networked wireless communication among adjacent first mobile computing devices;
moving the access zone by moving the plurality of first mobile computing devices in a synchronized manner in generally the same direction to maintain the generally uniform distance between adjacent first mobile computing devices; and
authorizing wireless computing access to the mobile computing system for a second mobile computing device via at least one of the first mobile computing devices of the mobile computing system based on a position of the second mobile computing device relative to the moving access zone as determined via direct non-networked wireless communication between at least one of the first mobile computing devices and the second mobile computing device.

12. The method of claim 11 and further comprising:
selectively altering at least one of a shape and size of the access zone while the access zone is moving by altering a relative position between at least two adjacent first mobile computing devices.

13. A wireless access determination system comprising:
a first computing device and a second mobile computing device, each of the first computing devices and the second mobile computing device including a wireless communication module with a position locator configured for direct wireless non-networked communication among adjacent first computing devices to determine a position of each of the first computing devices and direct wireless non-networked communication between the first computing devices and the second mobile computing device to determine a position of the second mobile computing device;
wherein the array of first computing device is configured for establishing an access zone adjacent the first computing device in which wireless computing access via the first computing devices is authorized for the second mobile computing device based on a position of the second mobile computing device relative to the access zone.

14. The system of claim 13 and further comprising:
a third computing device including a wireless communication module with a position locator, wherein the third computing device is configured for assisting the first computing device in establishing the access zone and determining the position of the second mobile computing device,
wherein the wireless communication module of each of the first computing devices, the second mobile computing device, and the third computing device is configured to transmit a signal having a radius that is at least equal to a distance of separation between the respective computing devices.

15. A wireless computing access control system comprising:
a computing system including:
a plurality of first stationary computing devices configured for arrangement as a first boundary, with each first stationary computing device including a wireless transceiver with a position locator and in direct, non-networked wireless communication with each other;
a plurality of second stationary computing devices configured for arrangement as a second boundary nested within the first boundary, with each first stationary computing device including a wireless transceiver with a position locator and in direct, non-networked wireless communication with each other and at least some of the first computing devices;
wherein the second boundary defines a first wireless computing access zone and an area between the first and second boundaries defines a second wireless computing access zone;
at least one third mobile computing device capable of direct non-networked wireless communication with the first stationary computing devices and the second stationary computing devices;
wherein each of the first stationary computing devices and the second stationary computing devices include a controller configured for authorizing wireless computing access to the computing system only when the at least one third mobile computing device is within at least one of the first wireless computing access zone and the second wireless computing access zone.

16. The method of claim 1 wherein the direct wireless non-networked communication is performed independent of a wireless telephone network.

17. The method of claim 1 wherein defining an access zone comprises:
wirelessly communicating among the plurality of first computing devices, and between the first computing devices and the second mobile computing device, according to at least one of a Bluetooth communication protocol, an UltraWideBand communication protocol, and an 802.11 communication protocol.

18. The method of claim 7 wherein defining the at least one first computing devices comprises:
defining the computer resources to include at least one of an electronic mail resource and an internet browser resource.

19. The method of claim 11 wherein defining the access zone comprises at least one of:
arranging the first mobile computing devices into at least one of an elliptical pattern to define a generally elliptically shaped access zone, a circular pattern to define a generally circular shaped access zone, and a generally rectilinear pattern to define a generally rectangular access zone.

20. A method of controlling wireless computing access, the method comprising: defining an electronic access zone via a plurality of first computing devices spaced from each other in a pattern and in proximity close enough to enable direct wireless non-networked communication with each other to define a boundary encompassing the electronic access zone;

arranging the plurality of first computing devices to substantially correspond with a physical boundary including at least one of a walled room and a building so that a perimeter of the electronic access zone substantially corresponds to the physical boundary; and authorizing wireless computing access for a second mobile computing device to at least one of the first computing devices only when the second mobile computing device is located within the physical boundary and within the electronic access zone, as determined via direct non-networked wireless communication between at least one of the first computing devices and the second mobile computing device.

\* \* \* \* \*

UNITED STATES PATENT AND TRADEMARK OFFICE
CERTIFICATE OF CORRECTION

PATENT NO.        : 7,149,529 B2                                  Page 1 of 1
APPLICATION NO.   : 09/850503
DATED             : December 12, 2006
INVENTOR(S)       : Travis Parry It is certified that error appears in the above-identified patent and that said Letters Patent is hereby corrected as shown below:

In column 11, line 66, in Claim 6, after "access to" insert -- at least one of --.

In column 11, line 67, in Claim 6, delete "device" and insert -- devices --, therefor.

In column 12, line 36, in Claim 8, delete "identify" and insert -- identity --, therefor.

In column 13, line 40, in Claim 13, before "first" delete "a" and insert -- an array of --, therefor.

In column 13, line 40, in Claim 13, delete "device" and insert -- devices --, therefor.

In column 13, line 51, in Claim 13, delete "device" and insert -- devices --, therefor.

In column 13, line 53, in Claim 13, delete "device" and insert -- devices --, therefor.

In column 13, line 62, in Claim 14, delete "device" and insert -- devices --, therefor.

In column 14, line 15, in Claim 15, delete "each first" and insert -- each second --, therefor.

In column 14, line 19, in Claim 15, after "first" insert -- stationary --.

Signed and Sealed this

Twenty-second Day of December, 2009

David J. Kappos
*Director of the United States Patent and Trademark Office*